June 1, 1971  D. J. THOMAS  3,582,356
COOKING DEVICE

Filed Nov. 12, 1968  2 Sheets-Sheet 1

INVENTOR
DONALD J. THOMAS
BY
Cohn and Powell
ATTORNEYS

June 1, 1971     D. J. THOMAS     3,582,356
COOKING DEVICE
Filed Nov. 12, 1968     2 Sheets-Sheet 2
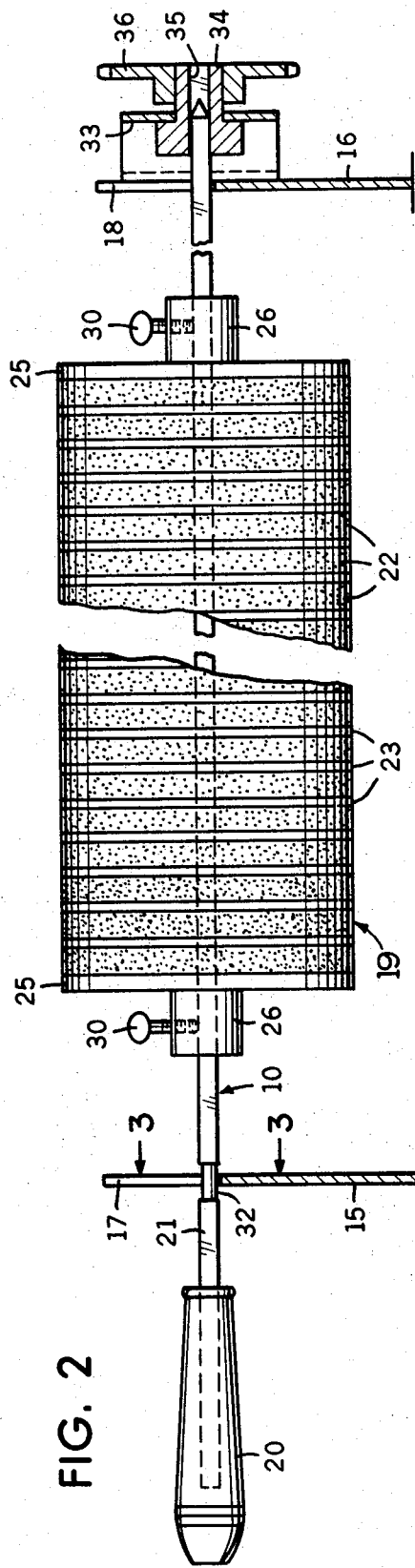
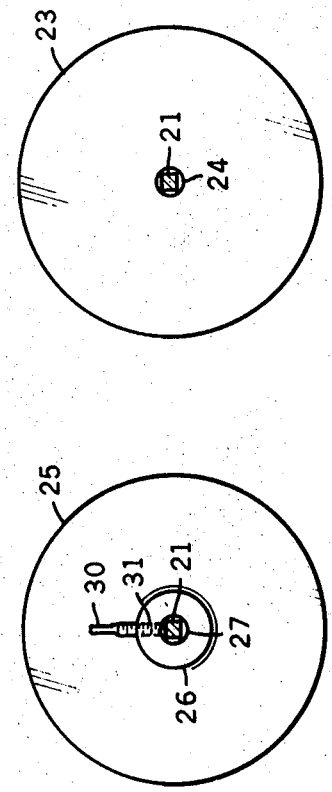
INVENTOR
DONALD J. THOMAS
BY
Cohn and Powell
ATTORNEYS

United States Patent Office 3,582,356
Patented June 1, 1971

3,582,356
COOKING DEVICE
Donald J. Thomas, Town and Country, Mo., assignor to Burger Chef Systems, Inc., Indianapolis, Ind.
Filed Nov. 12, 1968, Ser. No. 774,809
Int. Cl. A47j 37/04
U.S. Cl. 99—108      3 Claims

ABSTRACT OF THE DISCLOSURE

The cooking device, in its rotisserie form, includes a spit on which a plurality of conductor plates are mounted.

Meat patties are disposed between the conductor plates in alternating relation, and the multiple sandwich cartridge so formed is clamped together on the spit by means of a pair of opposed end conductor plates. The spit is rotatively supported by and between a pair of plates.

BACKGROUND OF THE INVENTION

This invention refers in general to a cooking device for grilling food and in particular, to a rotisserie for the quantity production of meat patties such as hamburgers, on a rotating spit.

In preparing hamburgers by the customary method, a quantity of ground beef is formed into a patty and grilled on each side in turn on a hot plate or griddle. This method has been used for many years and was undoubtedly used for cooking other food products long before the inception of the meat patty known as a hamburger.

Cooking on a griddle obviously requires a good deal of attention because of the possibility of burning the food before it is turned. Moreover, it is a slow method because only one face is cooked at a time and a finite time is required to turn the food portion and, of course, if quantity production is required, the surface areas of the hot plate must be correspondingly large.

The art of cooking foods of various kinds by the spit method is probably as old as the art of cooking itself. However, successful cooking by spit has suffered from the disadvantage that the morsel to be cooked must be inherently cohesive, so that it holds itself together during and after impaling on the spit. The spit method has not been feasible for cooking ground beef and the like up until now and it has been limited to foods having considerable body.

SUMMARY OF THE INVENTION

The present rotisserie permits the grilling of various types of food, and particularly ground beef, which are not otherwise adaptable for cooking by the spit or rotisserie method.

The food is cooked on both sides simultaneously, thereby speeding the cooking process considerably and obviating the need for continuous attention. Further, the cooking process achieves more consistent results than has been possible heretofore.

Because of the compactness of the device, a great many individual items, such as hamburger patties, may be cooked at one time in a confined space.

The rotisserie includes a spit: a plurality of food products, such as hamburger patties, carried by and disposed in spaced relation along the spit, and a plurality of conductor plates disposed along the spit in alternating spaced relation with the food products. Each conductor plate includes a central aperture receiving the spit. The conductor plates are substantially circular and the apertures are concentrically disposed.

Clamping means, outwardly disposed of the conductors, hold the conductor plates and patties in clamped relation.

The alternating conductor plates include opposed end plates, each end plate having an outer face adjacent to the clamping means and an inner face adjacent to a food product. The spit shaft is substantially square in cross section and the end conductor plates are integrally formed with the clamping means, the clamping means including a boss having a thumbscrew attachment selectively engaging a face of the shaft. Drive means, including a socket receiving the square shaft in keyed relation, rotates the spit.

The end conductor plates have a thermal conductivity substantially less than that of the inner plates for more consistent cooking results throughout the length of the conductor plate-patty cartridge.

BRIEF DESCRIPTION OF THE DRAWINGS

FIG. 2 is a fragmentary, elevational view of the rotisserie spit illustrating the conductor plates and meat patties mounted thereupon in alternating relation;

FIG. 3 is a sectional view of the spit as taken on line 3—3 of FIG. 2 and omitting the support member;

FIG. 4 is an elevational view of an end conductor plate, and

FIG. 5 is an elevational view of an inner conductor plate.

DESCRIPTION OF THE PREFERRED EMBODIMENT

Figure 1:
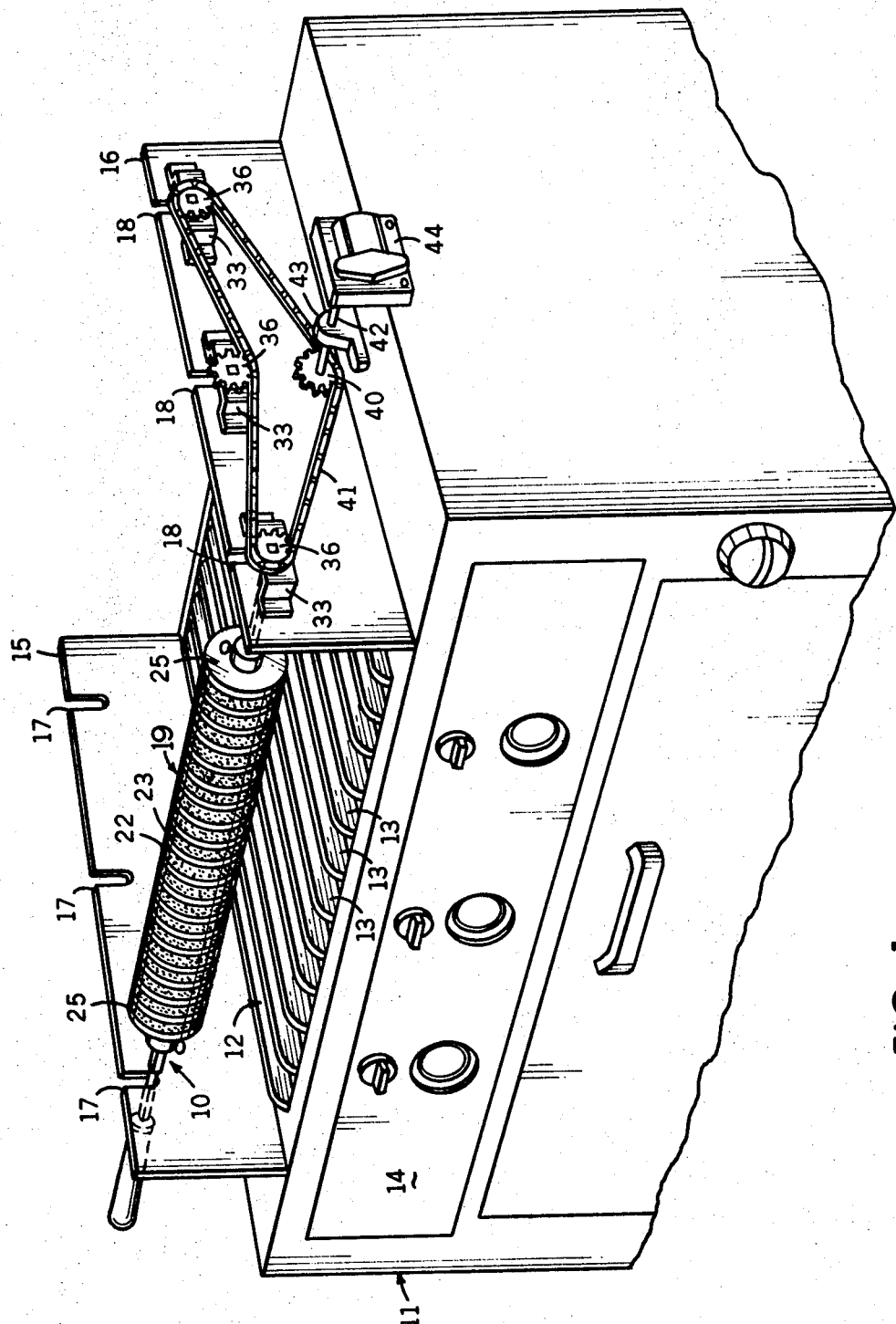
FIG. 1 is a fragmentary, perspective view of the rotisserie mounted on an oven.

Referring now by characters of reference to the drawings and first to FIG. 1, it will be understood that a rotisserie spit 10 is mounted above an oven unit 11. The oven unit 11 includes a grill generally shown by numeral 12, the grill 12 having a plurality of spaced bars 13.

The grill 12 is disposed above a firebox 14 which, in the preferred embodiment, contains a gas-burning unit. Obviously, the firebox 14 may contain burning charcoal in lieu of gas burners as a source of heat. Likewise, an electric heating unit may be utilized.

Mounted on the top of the oven unit 11 are two opposed side plates 15 and 16, constituting support means for the rotisserie spit 10. The side plate 15 includes a plurality of slots 17, each of which is adapted to receive a spit in rotatable relation. Side plates 16 also include a plurality of slots 18 which permit rotative engagement of the spit with a drive means as will be later described.

Referring now to FIG. 2 which illustrates the rotisserie spit 10 in some detail, it will be seen that the spit 10 includes a handle 20 and a square shaft 21. Spitted on and carried by the shaft 21 in alternating relation with a plurality of metal conductor plates 23, are a plurality of hamburger patties 22. This arrangement forms a conductor-patty cartridge, generally shown by numeral 19. The conductor plates 23, as shown in FIG. 5, each include a concentric aperture 24 receiving the spit in slidable relation.

End plates 25 are provided at opposite ends of conductor-patty, multiple sandwich cartridge 19. Each end plate 25, as indicated in FIG. 4, includes a boss 26 which is provided with an aperture 27 receiving the split 10. A thumbscrew 30, threadedly received within a hole 31 laterally disposed of the boss 26, permits the cooperating pair of end plates 25 to act as clamping means outwardly disposed of the conductor plates 23 for holding the conductor plates 23 and patties 22 in clamped relation on the spit 10.

From FIG. 2 in conjunction with FIG. 1, it will be seen that the rotisserie spit 10 is supported by side plates 15 and 16. The square shaft 21 includes a relatively short, circular portion 32 adjacent the handle 20, as clearly disclosed in FIG. 3. Portion 32 is of reduced thickness and is received in rotatable relation within one of the slots 17 provided in the side plate 15.

At its other end, the rotisserie spit 10 is indirectly supported by side plate 16. Side plate 16 includes a plurality of U-shaped brackets 33 welded or otherwise attached to the outside face. Mounted within each bracket 33 is a socketed bushing 34. The bushing socket 35 is square in cross section and receives the compatible square shaft 21 in keyed relation. The bushing 34 is rotatively received within the U-shaped bracket 33 and projects laterally outward. A pinion 36 is drivingly mounted on the projecting portion of the bushing 34.

Power is transmitted to each sprocket 36 by means of a drive sprocket 40 and chain 41. The drive sprocket 40 is drivingly mounted at one end of a transmission shaft 42 for rotation with the shaft 42 which is mounted on a bearing block 43. The transmission shaft 42 receives its power from an electric motor mounted on the oven 11 and generally shown by numeral 44.

It is thought that the structural advantages of this rotisserie have become fully apparent from the foregoing description of parts, but for completeness of disclosure, the installation and operation, as applied in particular to hamburger patties, will be briefly described.

Hamburger patties may be made by hand by simply flattening a ball of ground beef. They may also be obtained commercially packaged, already formed into a dislike shape. The patties 22, preferably in the disc-like form, are built up into a substantially cylindrical cartridge 19, illustrated in FIGS. 1 and 2, by placing a patty 22 onto and end plate 25, and subsequently placing one of the inner conductor plates 23 on the opposite face of the patty 22 in order to form a sandwich. The multiple sandwich cartridge 19 is then built up to a convenient length by placing patties 22 and inner conductor plates 23 in alternating sequence. The opposing end plate 25 may now be placed in position and the cartridge is complete; batches of twenty-four (24) hamburger patties 22 have been found to form a convenient cartridge length.

With the patties 22 and the conductor plates 23 and 25 in place, the spit 10 may be skewered into the cartridge 19 through the apertures 27 and 24 in the end and inner plates 25 and 23 respectively and the end plates 25 may then be tightened on the spit 10 to clamp the conductor plates 23 and intervening patties 22 together by means of the thumbscrews 30 provided in the boss 26 of each end plate 25.

The loaded spit 10 may then be placed into supported disposition by inserting the square point of shaft 21 through the slots 18 and into the compatible square section socket 35 of one of the bushings 34. Obviosuly, the socket 35 may be made slightly large to permit diagonal emplacement of the spit 10 in the socket. When the point of the shaft 21 is in place, the circular portion 32 of the square shaft 21 at the opposite shaft end is lowered into place and rotatively received within the opposite and coacting slot 17 of the opposite side plate 15.

It will be clear from FIG. 2 that rotation of the sprocket 36 will cause rotation of the loaded cartridge of patties 22 and conductor plates 23 in a manner to ensure even distribution of heat to the cartridge from the source of heat, the heat emanating from beneath the grill 12 in the usual manner of a rotisserie. The plurality of sprockets 36 in the preferred embodiment are driven by a single source of power by means of a drive sprocket 40 to which power is transmitted from an electric motor 44.

The metal conductor plates 23 have a high rate of thermal conductivity and aluminum, which has a thermal conductivity of 0.49 has been found to work well. In this regard, it will be understood that thermal conductivity is defined as the amount of heat in calories passing across one cubic centimeter per second for a rise in temperature of 1° centigrade, the conductivity being measured at substantially 100° centigrade.

As heat is received at the periphery of the conductor plates 23, the high thermal conductivity ensures that this heat will pass rapidly through the plates 23 toward their center. As a consequence of this, an even cooking of the patties 22, each of which is sandwiched between a pair of conductor plates 23, is assured. It will be appreciated that for most economical operation, the conductor plates 23 are circular in shape to conform generally to the patty configuration.

It has been found advantageous to provide end plates 25 having a thermal conductivity substantially less than that of the inner plates 23. The provision of end plates 25 having a comparatively low thermal conductivity tends to preclude overcooking of the patties 22 at the extremities of the cartridge 19. As a practical matter, the inner conductor plates 23 should have a thermal conductivity at least four times as great as that of the end plates.

It will, of course, be obvious that aluminum is not the only material that will give a satisfactory performance as the material of the plates 23. Further, the us of a covering material such as Teflon may be advantageous in some circumstances, particularly for the end plates 25.

Although the conductor plates 23 are used in the preferred embodiment in a rotisserie, the rotation of the spits is not essential. Satisfactory results have been obtained, for example, by placing a loaded cartridge consisting of hamburger patties 22 and alternately, adjacent conductor plates 23 in an oven. In such an oven, the heat is not applied as directly as is the case with a rotisserie. The heat is in fact applied more or less uniformly around the cooking article and this renders unnecessary the rotative action. Obviously, this is well within the scope of the invention.

It has been found that hamburgers cooked in the manner described tend to cook in their own juices, and yet the fat is drained off and not retained. This cooking process immeasurably improves the quality of the hamburger patty.

I claim:

1. A rotisserie for food products comprising:
  (a) a spit,
  (b) a plurality of conductor plates, each conductor plate including an aperture receiving the spit, the conductor plates adapted to be disposed along the spit in alternating relation with food products so that adjacent conductor plates sandwich an intervening food product,
  (c) clamping means outwardly disposed of the conductor plates and the food products in clamped relation,
  (d) support means for the spit, and
  (e) the plurality of conductor plates including opposed end plates adjacent to the clamping means, the end plates having a thermal conductivity substantially less than that of the plates inwardly disposed of said end plates.

2. A cooking device for patties, comprising:
  (a) an elongate spit,
  (b) a plurality of conductor plates, each of which is provided with an aperture receiving the spit, the plurality of conductor plates including:
    (1) a pair of spaced end plates, each of which includes a cooking surface facing toward the cooking surface of the other end plate, and
    (2) a plurality of intervening plates between the end plates, each of which includes opposed cooking surfaces, the plates adapted to be disposed along the spit in alternating relation with patties so that the cooking surfaces of axially adjacent plates engage and sandwich an intervening patty, and the spit extending through both the plates and the plates being exposed about their peripheries so as to conduct heat to the cooking surfaces and to the patties engaging and pressing against the surfaces, (c) clamping means on the end plates fixing the plates and patties in longitudinally clamped relation on the spit with the plates and patties pressed together.

3. A method of cooking patties, including the steps of:
(a) placing a plurality of conductor plates and patties alternately on an elongate spit, the plates having apertures receiving the spit, the end plates having cooking surfaces facing toward each other, and the intervening plates having opposed cooking surfaces,
(b) pressing the plates and patties together so that the cooking surfaces of axially adjacent plates engage and sandwich an intervening patty,
(c) clamping the end plates to the spit to hold the plates and patties in pressed relation on the spit, the spit extending through both the plates and the patties,
(d) exposing the plates and patties about their peripheries so as to conduct heat to the cooking surfaces and thence to the patties engaging the surfaces, and
(e) rotating the spit, and hence the plates and patties in a heated area whereby to heat the plates and cook the patties.

References Cited
UNITED STATES PATENTS

| | | | |
|---|---|---|---|
| 2,652,768 | 9/1953 | Moreno | 99—448X |
| 2,717,415 | 9/1955 | Gerhart | 99—426UX |
| 2,885,951 | 5/1959 | Wolske | 99—421(H)X |
| 2,896,528 | 7/1959 | Walters et al. | 99—430 |
| 2,985,096 | 5/1961 | Wolske | 99—421(P) |
| 3,169,470 | 2/1965 | Oatley | 99—421(HH) |

WALTER A. SCHEEL, Primary Examiner

A. O. HENDERSON, Assistant Examiner

U.S. Cl. X.R.

99—421, 447; 165—185